United States Patent Office 3,368,623
Patented Feb. 13, 1968

3,368,623
PERMEABLE CEMENT FOR WELLS
Lloyd G. Carter and Dwight K. Smith, Duncan, Okla.,
Assignors to Halliburton Company, Duncan, Okla., a
corporation of Delaware
No Drawing. Filed May 3, 1965, Ser. No. 452,927
15 Claims. (Cl. 166—12)

ABSTRACT OF THE DISCLOSURE

Method of providing a permeable lining in a well by injecting into the space between the bore hole and the casing a hardenable well lining material containing a removable filler material, and removing the filler material after the hardenable material has solidified in the annular space. The lining thus formed permits the passage of formation liquids from a producing region surrounding the well into the bore hole, while restricting the passage of formation fines.

---

This invention relates to a novel method of lining wells to provide a permeable lining which permits the passage of formation liquids from the producing region into the bore hole of the well while restricting the passage of formation fines.

When a formation contains a high percentage of loose unconsolidated sands or other fines, difficulties are often encountered to producing the formation. The fines tend to migrate toward and into the bore hole of the gas or oil well and restrict the flow of liquid, reducing production. It is possible that the fines can shut off the flow of liquids altogether. This can result in the complete loss of the well. Also, formation fines are very abrasive when transported through the tubing, pumps, and other fluid handling equipment. Thus, there has existed a need for some convenient and effective method whereby the migration of fines can be restricted.

Previously it has been proposed to provide a permeable cement lining material for use in wells by the incorporation therein of a porous refractory material. In accordance with this procedure, the pores of the refractory material are first plugged with an organic solvent-soluble filler substance such as tar or wax. After blending the plugged refractory material with the cement slurry, the slurry is placed in the well. Thereafter, when the cement has set, the filler is extracted from the refractory material with solvent to leave a cement lining material having the porous refractory material dispersed therein. This technique suffers from several disadvantages. For example, it is necessary to pretreat the refractory material with the filler in order to plug the pores therein, prior to blending with the cement slurry. Further, since the pores in the final product are provided by the discrete particles of refractory material, the pores are not uniformly distributed throughout the set cement lining material.

It has also been proposed to form a permeable synthetic resin lining in wells by the blending of clay muds therein prior to the placing of the resin in the well. Thereafter, during the setting process minute holes or pores are formed in the resin which provide a permeable lining. This procedure is limited to the use of certain kinds of clay in the production of the porous lining material. Also, it has been found that the clay must be blended with the resin immediately prior to use, otherwise the lining is not satisfactory as to permeability.

In summary then, none of these methods for providing a permeable cement lining in wells has proven entirely satisfactory. Accordingly, it is a principal object of this invention to provide a novel method of placing a permeable lining in a well capable of effectively filtering out the formation fines as the formation liquids migrate toward the bore hole More particularly, it is an object of this invention to provide a permeable lining in a well by injecting into the annular space between the bore hole and the casing, a hardenable well lining material containing a removable filler material, and removing the filler material after the composition has hardened to provide the desired permeable lining in the annular space.

These, and other objects of this invention will become apparent from the more detailed description which follows.

Briefly, the method of the present invention comprises injecting into the annular space between the bore hole and the casing in the vicinity of the producing region of a well, a hardenable well lining material having uniformly dispersed therein and in intimate contact therewith, a normally solid and inert homogeneous removable filler material. This composition is permitted to harden in the annular space and then the filler material is removed from the hardened well lining material to provide a permeable lining which permits the passage of formation liquids from the producing region into the bore hole, while restricting the passage of formation fines.

When the hardenable well lining material is injected into the well and permitted to harden, the desired porous permeable matrix is readily provided by dissolving, flushing or steaming out of the filler material. Accordingly, it is immediately apparent that the removable filler material may be any material which does not enter into the basic hardening or setting process, and at the same time can be removed from the final set well lining material.

Typical of the removable filler materials for use in this invention are long chain fatty acids, long chain fatty acid soaps, paraffins, petroleum waxes, asphalt, asphaltenes, naphthalene, Gilsonite, coal tar, and other coal and resin products.

To facilitate the removal of the filler material, a surfactant or a surface active agent can be coated on the filler to insure that the matrix material does not bond to the filler.

Another class of filler materials may be water soluble additives, such as sugar, rock salt and calcium chloride. However, since these materials are water soluble, and water is the carrier phase for the cement slurry, it is necessary to coat them with a material which is only slowly soluble in the cement slurry. To control the dissolution of these materials in water, the individual grains or granules can be thinly coated with wax, stearic acid or the like. As is apparent from the foregoing, the coated grains or granules can be removed by dissolution in solvents or by being melted by heating to above their melting point.

Still another class of filler materials which may be removed from the well lining material after it has hardened in place, are the short length fibers such as fiberglass or any of the natural or synthetic fibers, such as nylon (polyhexamethylene adipate), Orlon (polyacrylonitrile), Dacron (polyethylene terephthalate), polypropylene, polyvinyl chloride, polyethylene, wool, cotton, rayon (cuprammonium), Acrylon, Vinyon, Arnel, Zefran, Darvan, and the like. These fibers generally have a length of about 0.25 to about 5 inches and are from about 0.001 to about 0.200 inch in diameter.

The hardenable well lining material for use in this invention is usually a cement slurry or a curable thermosetting resin composition. Portland cement materials are familiar to those skilled in the art. Typical curable resin compositions are the partially condensed phenolformaldehydes such as those described in United States Patent No. 2,546,624, issued Mar. 27, 1951

When the hardenable well lining material contains cement, it has been found that the use from about 20% to about 80% by weight of cement of silica flour in the cement slurry is preferred in order to provide a cement which is stable at high temperatures. When the silica flour is present, the hardened cement composition is particularly resistant to deterioration from steam or other hot materials used to remove the filler material. The high temperature properties of the cement composition may also be improved by the use of an effective amount, on the order of 0.5 to 2.0% by weight of cement, of a cement densifier.

As will be apparent to those skilled in the art, the size of the pore and vugular spaces in the final product can be controlled by the size and particle size distribution of the filler material.

It will be understood that the cement slurry composition of this invention may also contain various additional cement slurry ingredients, accelerators, retarders, friction-reducing agents, and the like.

The cement slurry composition of this invention may be compounded and mixed employing conventional cement slurry mixing apparatus. The blended slurry may be injected into the well in the same manner as cement slurries already known to those skilled in the art. In one preferred embodiment the cement slurry is placed in the annulus between the formation and a slotted liner. Thereafter, the filler material is removed to provide the porous permeable cement matrix. In place of the slotted liner, the casing may be the more conventional pipe. After the cement composition has set, the casing can be perforated by jet or gun perforation in accordance with procedures familiar to those skilled in the art.

In the composition of this invention the amount of removable filler employed is sufficient to provide a liquid permeable lining, and is generally the range from 25 to 500 parts filler per 100 parts of hardenable well lining material.

The removal of the filler material after the well lining material has hardened may be accomplished in a number of ways. The particular technique employed depends upon the composition of the filler. For example, most of the organic filler materials may be removed by injecting steam or other hot gases or liquids into the well in the vicinity of the lining material. The heat required to remove the filler material may also be supplied by the use of a heating element which may be lowered into the bore hole and into contact with that area of the lining from which the filler is to be removed. As will be apparent to those skilled in the art, any suitable solvent for the filler material, such as benzene, hexene, petroleum cuts, and the like, may also be used to wash out the filler material. Likewise, in the case where the filler material is water soluble, hot water may be used to remove the filler. The fiber fillers may also be removed by heating. The following fibers will melt at the indicated temperatures: polyethylene at 230 to 250° F., and Vinyon at 260° F. Many of the fibers can be removed by the use of acid or other solvents. It has been found that cellulose acetate may be removed by acetone or glacial acetic acid. Arnel by methylene chloride, Dacron by concentrated sulfuric acid, and cotton or rayon by hot dilute acid or cold concentrated acid.

In general, once the filler material has been melted or dissolved, it is dispersed into the formation, or in some cases it runs into the bore hole where it may be flushed to the surface.

The following examples illustrate the invention:

EXAMPLE 1

A 9-inch diameter hole was drilled to a depth of 302 ft. and cased with 5½ inch, 18 lbs. casing from the surface to 228.5 ft., at which depth a 5½ inch to 4½ inch swaged nipple was used to allow 4½ inch casing to be run to 263 ft. and a 4½ inch slotted liner to 292.5 ft. The casing was then cemented with a slurry containing equal amounts of silica flour and cement from the surface to 262 ft., and cement containing 80 lbs. of silica flour, 400 lbs. of Gilsonite and 25.04 gallons of water per sack of cement (94 lbs. per sack) from 262 ft. to the total depth. The cementing procedure consisted of placing the cement slurry on the bottom of the well through the drill pipe, pulling the drill pipe and then running the liner and casing into the slurry. The liner, being filled with sand and plugged at the top with a 1-ft. gypsum cement plug, displaced the slurry up around the casing. Reverse circulation was then used to remove the excess cement from behind the casing through the two 2-inch diameter holes cut in the pipe just above the liner. A cement slurry containing equal parts of cement and silica flour was then displaced down the casing with a 5½-inch, 5 wiper top plug. After allowing the cement to set, the plug and sand were drilled out. The well was then steamed for a total of 6½ hours to remove the Gilsonite. During the steaming the temperature of the steam coming from the steam generator was held to a maximum of 575° F. the temperature of the steam returning through the annulus was approximately 300° F. A straddle packer was then used to isolate various zones of the liner to test for communication through the porous cement sheath. It was found that the formation would take fluid at a depth of 264 feet, which is approximately the depth at which the slots in the liner begin. Communication around the packer and to an adjacent water well located 10.25 ft. away could be established throughout the entire length of the liner.

EXAMPLE 2

A slotted 2-inch pipe, each slot being about 1 inch long and approximately ¼ inch wide, was placed in a 4-inch pipe, which had been drilled with 6⅜ inch holes. The annular space was then filled with a cement composition containing 1,000 parts cement, 839 parts silica flour, 2129 parts Gilsonite and 1498 parts water. The cement composition was allowed to set at 80° F. for 18 hours. Thereafter, steam was placed through the 2-inch pipe. Shortly after the start of the steam injection, water was observed to be coming out of the ⅛ inch holes in the 4-inch pipe. After 30 minutes, the water was observed to be bubbling from these holes. After 1½ hours of the circulation of steam through the 2-inch pipe, the Gilsonite had been effectively removed, and it was found that the cement lining material was quite porous and provided good communication between the 2-inch pipe and the 4-inch pipe.

When the foregoing example is repeated using asphalt in lieu of Gilsonite, satisfactory results are also obtained.

While the foregoing examples illustrates the use of the porous permeable well lining composition accomplished by first hanging a slotted liner and thereafter injecting the composition around the liner in the vicinity of the producing formation, these compositions may also be used, for example, in secondary and tertiary recovery wells where steam or hot or cold liquids are used to stimulate a formation having loose unconsolidated formation fines. It should be noted further that the present invention is not directed to any treatment of the earth formations themselves. The permeable lining material remains in the bore hole so that if it eventually becomes plugged, it can readily be drilled out and replaced.

While only a few embodiments of the invention have been described specifically, it will be apparent to those skilled in the art that many modifications can be made in the invention without departing from the scope of the appended claims.

We claim:

1. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable Gilsonite filler material, permitting said composition to harden in the annular space, and heating said filler material to above its melting temperature with a hot fluid which is not a solvent for Gilsonite to remove it from the hardened well lining material and provide a permeable lining which permits the passage of formation liquids from the producing region into the bore hole, while restricting the passage of formation fines.

2. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable Gilsonite filler material, permitting said composition to harden in the annular space, and heating said filler material to above its melting temperature with a heating element to remove it from the hardened well lining material and provide a permeable lining which permits the passage of formation liquids from the producing region into the bore hole, while restricting the passage of formation fines.

3. A method of providing a permeable lining in a well which comprises injecting into the annular space between the bore hole and the casing in the vicinity of the producing region of the well, a composition comprising a hardenable well lining material having uniformly dispersed therein and in intimate contact therewith Gilsonite particles, permitting said composition to harden in the annular space, and heating said Gilsonite to above its melting temperature by contact with steam, to remove it from the hardened wall lining material and provide a permeable lining which permits the passage of formation liquids from the producing region into the bore hole, while restricting the passage of formation fines.

4. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable short length fiber material, permitting said composition to harden in the annular space, and heating said short length fiber material to above its melting temperature to remove it from the hardened well lining material and provide a permeable lining which permits the passage of formation liquids from the producing region into the bore hole, while restricting the passage of formation fines.

5. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable short length polyethylene fiber material, permitting said composition to harden in the annular space, and heating said short length polyethylene fiber material to above its melting temperature to remove it from the hardened well lining material and provide a permeable lining which permits the passage of formation liquids from the producing region into the bore hole, while restricting the passage of formation fines.

6. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable short length polypropylene fiber material, permitting said composition to harden in the annular space, and heating said short length polypropylene fiber material to above its melting temperature to remove it from the hardened well lining material and provide a permeable lining which permits the passage of formation liquids from the producing region into the bore hole, while restricting the passage of formation fines.

7. A method of providing a permeable lining in a well which comprises injecting into the annular space between the bore hole and the casing in the vicinity of the producing region of the well, a composition comprising a hardenable well lining material having uniformly dispersed therein and in intimate contact therewith, from about 25 to 500 parts by weight per 100 parts of said hardenable well lining material of a normally solid and inert homogeneous meltable Gilsonite filler material, permitting said composition to harden in the annular space, and heating said filler material to above its melting temperature with a hot fluid which is not a solvent for Gilsonite to remove it from the hardened well lining material and provide a permeable lining which permits the passage of formation liquids from the producing region into the bore hole, while restricting the passage of formation fines.

8. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous meltable Gilsonite filler material, permitting said composition to harden in the annular space, and heating said filler material to above its melting temperature by contact with a hot gas which is not a solvent for Gilsonite to remove it from the hardened well lining material and provide a permeable lining which permits the passage of formation liquids from the producing region into the bore hole, while restricting the passage of formation fines.

9. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous water soluble filler material, said material being coated with a coating which is slowly soluble in said hardenable well lining material, permitting said composition to harden in the annular space, and removing said filler material from the hardened well lining material to provide a permeable lining which permits the passage of formation liquids from the producing region into the bore hole, while restricting the passage of formation fines.

10. A method of providing a permeable lining in a well which comprises injecting into the annular space between the bore hole and the casing in the vicinity of the producing region of the well, a composition comprising a hardenable well lining thermosetting resin material having uniformly dispersed therein and in intimate contact therewith, a normally solid and inert homogeneous removable Gilsonite filler material, permitting said composition to harden in the annular space, and removing said filler material from the hardened well lining material by melting with a hot fluid which is not a solvent for Gilsonite to provide a permeable lining which permits the passage of formation liquids from the producing region into the bore hole, while restricting the passage of formation fines.

11. A method of providing a permeable lining in a well which comprises injecting into the annular space between the bore hole and the casing in the vicinity of the producing region of the well, a composition comprising a hardenable well lining cement material having uniformly dispersed therein and in intimate contact therewith Gilsonite particles, permitting said composition to harden in the annular space, and heating said Gilsonite to above its melting temperature by contact with steam, to remove it from the hardened well lining material and provide a permeable lining which permits the passage of formation liquids from the producing region into the bore hole, while restricting the passage of formation fines.

12. A method of providing a permeable lining in a well which comprises injecting into the annular space between the bore hole and the casing in the vicinity of the producing region of the well, a composition comprising a hardenable well lining thermosetting phenolformaldehyde resin material having uniformly dispersed therein and in intimate contact therewith, a normally solid and inert homogeneous removable Gilsonite filler material, permitting said composition to harden in the annular space, and removing said filler material from the hardened well lining material by melting with a hot fluid which is not a solvent for Gilsonite to provide a permeable lining which permits the passage of formation liquids from the producing region into the bore hole, while restricting the passage of formation fines.

13. A method of providing a permeable lining in a well which comprises injecting into the annular space between the bore hole and the casing in the vicinity of the producing region of the well, a composition comprising a hardenable well lining material having uniformly dispersed therein and in intimate contact therewith, a normally solid and inert homogeneous water soluble filler material, said material being coated with a coating which is slowly soluble in said hardenable well lining material permitting said composition to harden in the annular space, and heating said filler material to above its melting temperature by contact with water to remove it from the hardened well lining material and provide a permeable lining which permits the passage of formation liquids from the producing region into the bore hole, while restricting the passage of formation fines.

14. A method of providing a permeable lining in a well comprises injecting into the annular space between the bore hole and the casing in the vicinity of the producing region of the well, a hardenable well lining material containing cement and silica flour having uniformly dispersed therein and in intimate contact therewith, a normally solid and inert homogeneous meltable Dacron fiber material, permitting said composition to harden in the annular space, and dissolving said short length Dacron fiber material by contact with concentrated sulfuric acid to remove it from the hardened well lining material and provide a permeable lining which permits the passage of formation liquids from the producing region into the bore hole, while restricting the passage of formation fines.

15. A method of providing a permeable lining in a well which comprises injecting into the annular space between the bore hole and the casing in the vicinity of the producing region of the well, a hardenable well lining material containing cement and silica flour having uniformly dispersed therein and in intimate contact therewith, from about 25 to about 500 parts by weight per 100 parts of said hardenable well lining material of Gilsonite particles, permitting said composition to harden in the annular space, and heating said Gilsonite material to above its melting temperature by contact with steam, to remove it from the hardened well lining material and provide a permeable lining which permits the passage of formation liquids from the producing region into the bore hole while restricting the passage of formation fines.

References Cited

UNITED STATES PATENTS

| | | | |
|---|---|---|---|
| 2,187,895 | 1/1940 | Sanders | 166—12 |
| 2,193,808 | 3/1940 | Dieterich | 166—12 |
| 2,265,923 | 12/1941 | Normand | 166—40 |
| 2,294,294 | 8/1942 | Grebe | 166—33 |
| 2,673,825 | 3/1954 | Biefeld et al. | 260—2.5 |
| 2,799,341 | 7/1957 | Maly | 166—40 X |
| 2,805,719 | 9/1957 | Anderson | 166—29 |
| 3,036,633 | 5/1962 | Mayhew | 166—31 |
| 3,044,547 | 7/1962 | Jarboe | 166—12 |
| 3,062,760 | 11/1962 | Dermody et al. | 260—2.5 X |
| 3,126,959 | 3/1964 | Ortloff | 166—25 X |
| 3,208,525 | 9/1965 | Caldwell et al. | 166—33 |
| 3,219,109 | 11/1965 | Stein | 166—12 |

CHARLES E. O'CONNELL, *Primary Examiner.*

ERNEST R. PURSER, *Examiner.*

I. A. CALVERT, *Assistant Examiner.*